United States Patent [19]
Fitoussi et al.

[11] Patent Number: 5,624,658
[45] Date of Patent: Apr. 29, 1997

[54] PROCESS FOR PRODUCTION OF ZEOLITES

[75] Inventors: Mayer Fitoussi, Haifa; Amir Korngold, Beer-Sheva, both of Israel

[73] Assignee: Super Industry Ltd., Beer-Sheva, Israel

[21] Appl. No.: 365,613

[22] Filed: Dec. 28, 1994

[30] Foreign Application Priority Data

Jan. 5, 1994 [IL] Israel ......................................... 108272

[51] Int. Cl.$^6$ ...................................................... C01B 39/40
[52] U.S. Cl. .......................... 423/702; 423/704; 423/705; 423/DIG. 22
[58] Field of Search ..................... 423/700, 701, 423/702, 704, 705, 709, DIG. 22; 502/77

[56] References Cited

U.S. PATENT DOCUMENTS

| | | | |
|---|---|---|---|
| 3,228,969 | 1/1966 | Kerr | 423/705 |
| 4,314,979 | 2/1982 | Deabriues | 423/700 |
| 4,385,042 | 5/1983 | Whitehurst et al. | 423/711 |
| 4,649,036 | 3/1987 | Pastorello et al. | 423/700 |
| 5,143,879 | 9/1992 | Whitehurst | 423/702 |
| 5,194,410 | 3/1993 | Calabro | 423/705 |
| 5,227,151 | 7/1993 | Calabro | 423/703 |

OTHER PUBLICATIONS

Lok et al "The Role of Organic Molecules in Molecular Sieve Synthesis" *Zeolites* Oct. 1983 pp. 282–291.
Felder et al *Elementary Principles of Chemical Processes* 1978, p. 106.

*Primary Examiner*—Mark L. Bell
*Assistant Examiner*—David Sample
*Attorney, Agent, or Firm*—Sprung Horn Kramer & Woods

[57] ABSTRACT

Zeolites having a $SiO_2$ to $Al_2O_3$ ratio of more than 10, particularly ZSM-5 zeolites, are produced by:

(a) forming a reaction mixture comprising a silica source, an aluminium source an inorganic base and templating agent and adjusting the pH to 10.7–11.7;

(b) heating the reaction mixture whereby zeolite crystals are formed;

(c) separating the crystallized zeolite from the reaction mixture leaving behind a residual mixture and calcinating the zeolite to decompose the organic component;

(d) adding to the residual mixture templating agent at an amount so as to form a reaction mixture wherein the level of the templating agent is as in the reaction mixture of step (a); and (c) repeating steps (a)–(d), with the reaction mixture obtained in step (d) serving as the source for the templating agent of step (a) and every one or more cycles, treating the residual mixture of step (c) to remove salts therefrom.

10 Claims, 1 Drawing Sheet

PROCESS FOR PRODUCTION OF ZEOLITES

FIELD OF THE INVENTION

The present invention concerns a process for the production of zeolites. More specifically the present invention concerns a process for the production of zeolites wherein a large percentage of the templating agent is recycled.

BACKGROUND OF THE INVENTION

Zeolites are alumina silica minerals that contain alkali and alkaline-earth metals, such as sodium, potassium and calcium as well as water molecules within their structural framework. The framework is relatively porous, enclosing inter-connected cavities in which metal cations and water molecules resides.

The cations and water molecules have a considerable freedom of movement within the framework of aluminium, oxygen, and silicon atoms and this gives zeolite cation-exchange and reverse dehydration properties. The porous framework of the zeolites enables them to act as molecular sieves which are able to separate molecular mixtures on the basis of the size and shape of the molecular compounds, or enables the selective absorption of gasses. These unique properties are utilized in diverse industrial processes such as the purification of water and other liquids, purification of gasses, chemical separation, catalysis, and decontamination of radioactive waste.

Synthetic zeolites are synthesized with various organic agents, termed hereinafter "*templating agents*", which are responsible for the formation of uniform pores in the newly synthesized zeolite crystals. The templating agent act as void fillers and in addition extend the possible range of silica to alumina ratios capable of forming zeolites. The templating agent is strapped, during crystallization within the structure of the zeolite and is then removed by calcination so that only a pore is left where the templating agent was originally trapped. A large number of templating agents are used, among them various organic amines and organic alcohols the most common being tetrapropylammonium bromide (TPA-Br), tetrabutylammonium bromide (TBA-Br).[1–7]

The excess of the templating agent present in the reaction mixture after the crystallization of the zeolites is discarded as waste. Since the templating agent is the most expensive component in zeolite production, the need to constantly replenish the reaction mixture with large amounts of templating agents after each cycle of zeolite formation considerably raises the cost of production.

Furthermore, most templating agents, such as TPA-Br, are toxic, and consequently due to environmental consideration, have to be disposed utilizing expensive waste-disposal techniques.

It would have been highly desirable to provide a process for production of zeolites which recycles a large percentage of the templating agent. Such a process could decrease the amount of templating agents which has to be added to each cycle of production and consequently considerably lowers the cost of production of zeolites. Furthermore, such a process could minimize the problem of toxic waste.

SUMMARY OF THE INVENTION

The present invention concerns a batch process for the production of zeolites having a $SiO_2$ to $Al_2O_3$ ratio of more than 10 comprising the steps of:

(a) forming a reaction mixture comprising a silica source, an aluminium source, an inorganic base and templating agent and adjusting the pH to 10.7–11.7;

(b) heating the reaction mixture whereby zeolite crystals are formed;

(c) separating the crystallized zeolite from the reaction mixture leaving behind a residual mixture and calcinating the zeolite to decompose the organic component;

(d) adding to the residual mixture templating agent at an amount so as to form a reaction mixture wherein the level of the templating agent is as in the reaction mixture of step (a); and (e) repeating steps (a)–(d) with the reaction mixture obtained in step (d) serving as the source for the templating agent of step (a), and every one or more cycles, treating the residual mixture of step (c) to remove salts therefrom.

The process of the present invention is useful for the production of any zeolite with a $SiO_2$ to $Al_2O_3$ ratio of at least 10, preferably a ratio in the range of 25–80. The process of the present invention is especially useful in the production of ZSM-5 zeolites.

The silica source used in the process of the present invention may be sodium silicate, silicate hydrates, water glass, silica sols, silica gels, and other synthetic glasses, volcanic glasses, minerals including clay minerals, etc. or a combination of two or more of the above.

The aluminium source used in the process of the present invention may be pure aluminium (Al) dissolved in NaOH, $Al_2(SO_4)_3$, $Al_2O_3$, metal aluminates, $Al(OH)_3$, AlOOH, Al alkoxides, Al salts, etc.

The base used in the process of the present invention may be for example, NaOH, KOH, etc.

The templating agent may be selected from the group consisting of TPA-Br, TBA-Br, organic amines and alcohols. More particularly, the templating agent is selected from the group consisting of those organic compounds specified in ref. 1, Szostak "*Molecular Sieves Principles of Synthesis and Identification*", in the chapter termed "*Hydrothermal Zeolite Synthesis*" which is incorporated herein by reference.

The pH of the reaction mixture is typically adjusted with an acid such as $H_2SO_4$, HCl, HBR to a pH of 10.7 to 11.7, preferably to a pH of 11.0 to 11.3.

The reaction mixture is heated to a temperature of 100° C. to 190° C., preferably 170° C. to 180° C., in order to produce zeolite crystals.

The zeolite crystals are then separated from the reaction mixture, for example by filtration and dried in an oven to remove excess water. The zeolites are then calcinated, usually by heating to a temperature of 500° C. in order to decompose the organic templating agents.

The residual reaction mixture left after separation of the zeolite crystals serves as a source for most residual compounds present in the original reaction mixture and especially for templating agents, in further cycles of zeolite production.

The reaction mixture has to be replenished in order to be used in the next cycles, only with the amount of templating agent which is calculated to be incorporated in the separated zeolite crystal. This amount usually represents only about 8%–12% of the amount required in the first cycle of zeolite production.

After one or more cycles, usually every 2 to 4 cycles, the concentration of salts produced by the reaction between the inorganic base and the acid rises to a concentration which hinders further synthesizing of zeolites. Therefore after several cycles of production these salts have to be separated from the residual reaction mixture to be recycled. These salts are, for example NaBr or $Na_2SO_4$.

The above salts can be separated from the residual reaction mixture by any means known in the art such as: by use of electrodialysis using semi-permeable selective membranes which allow passage of ions based on size and charge; by use of cation exchange resins produced by sulfonation of copolymers of styrene D.V.B., by nanofiltration according to molecular weight, by lowering the temperature of the reaction mixtures thus precipitating the salts, etc.

In accordance with the process of the present invention only 8% to 12% of the templating agent is required in the continuous production of zeolites as compared to state of the art processes.

According to the process of the present invention virtually all the templating agent is recycled so that none is discarded and consequently the problem of disposal of toxic waste and the cost of such disposal is essentially eliminated.

BRIEF DESCRIPTION OF THE INVENTION

FIG. 1 shows a schematic flow chart representation of the process of the invention.

DETAILED DESCRIPTION OF THE INVENTION

Figure 1:
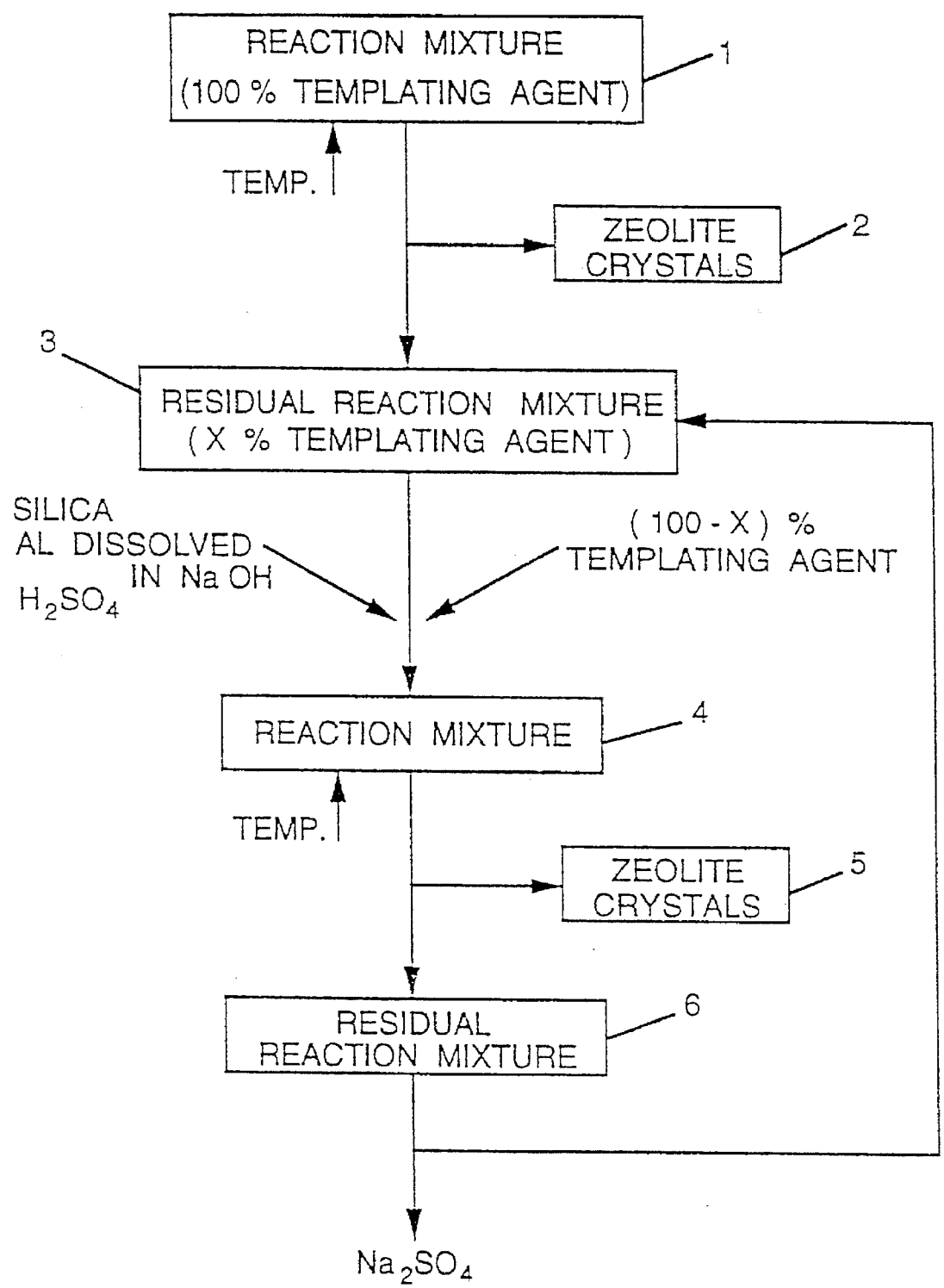

The invention will now be illustrated by the following non-limiting examples.

EXAMPLE I

First Cycle of Preparation of ZSM-5

Zeolite ZSM-5 was produced by mixing solutions of 200 g sodium silicate solution (28% $SIO_2$+8% $Na_2O$+64% $H_2O$) with 200 ml solution which contains 36 g tetrabutylammonium bromide (TBA-Br) serving as a templating agent.

Another solution which contains 0.8 g Al dissolved in 50 ml 10% NaOH was introduced to the first solution. After vigorous mixing, the pH was carefully adjusted by solution of 20% $H_2SO_4$ to a pH of 11.0. The mixture was then heated for 40 hours at a temperature of 170° C. and 50 g of ZSM-5 was obtained. The zeolite was separated from the reaction mixture by filtration and characterized by X-ray diffraction. The zeolites were heated at 500° C. for 5 hours in order to decompose the templating agent to $CO_2$ and $H_2O$, causing a 10.5% derease of weight.

EXAMPLE II

Second Cycle of Preparation of ZSM-5

The process described in Example I above was repeated with the difference being that as a source of TBA-Br served the reaction mixture left after separation of zeolites from the previous step (Example I) was replenished with 6 g of externally added TBA-Br). The zeolite ZSM-5 thus obtained was characterized by x-ray diffraction essentially identical to the ZSM-5 obtained in Example I.

EXAMPLE III

Third Cycle of Production of ZSM-5

The reaction mixture of Example II was treated for removal of sodium sulphate by an electrodialysis process utilizing a selective cation and selective anion exchange membranes, Neosepta Cl-2.5T and Neosepta AV-4T, respectively, (Tokuyuma Soda Co. Ltd., Japan) which permits only passage of small ions and retains in the reaction mixture the $TBA^+$ cartons.

The reaction mixture treated as described above was used as a source for a templating agent, together with 6 g of replenished $TBA^+$ in the process as described in Example II. ZSM was characterized by X-ray diffraction as in Examples I and II.

EXAMPLE IV

Batch Production

As can be seen in FIG. 1, the production starts with formation of reaction mixture 1 as described in Example 1. After rise of temperature and subsequent formation and separation of zeolite crystals 2, residual reaction mixture 3 is obtained. This residual reaction mixture comprises only a part, say X %, of the amount of template agent originally present in reaction mixture 1.

To residual reaction mixture 3 there are added templating agents in an amount sufficient to bring it to the level of templating agent present in reaction mixture 1, as well as sodium silicate aluminium dissolved in an inorganic base (NaOH) and an acid ($H_2SO_4$) to form reaction mixture 4.

Zeolite crystals 5 are again formed by the rise of temperature and separated from reaction mixture 2 to give residual reaction mixture 6.

This reaction mixture is treated by separating salts ($Na_2SO_4$) therefrom and is recycled in the batch process as reaction mixture 3.

REFERENCES

1. Szostak, I. R., Molecular Sieves Principles of Synthesis and Identification, 1989, Van No Strard, Reinhold Catalysis Series 1989.
2. Handreck G. Paul and Smith, Thomas D., "A Study of the Progress of Formation of Crystalline Intergrowths of Zeolite ZSM-5 on Silicolite", *Zeolites*, 11, 1991.
3. Zhao, Daging, Qiu Shilun and Pang, Werqin, "Synthesis and Characterization of ZSM-5 containing Tripropylammonium and Tetraethylammonium Cations", 13, pp. 478–480, 1993.
4. Ghamami Majid and Sand, L. B., "Synthesis and Crystal Growth of Zeolite ($NH_4$, TPA)-ZSM-5", *Zeolites*, 3, pp 155–162, 1983.
5. Mostowicz Ryszard and Sand, L. B., "Morphological Study of ZSM-5 Grown in the $12Na_2O/4.5$ $(TPA)_2O$ System", *Zeolites*, 3, pp 219–225, 1983.
6. Sugimoto, Michio, Katsuno, Hisashi, Takatsu Kozo and Kawata Nobosu, "Correlation between the Crystal Size and Catalytic Properties of ZSM-5 Zeolites", *Zeolites*, 7, pp 503–507, 1987.
7. Zones, S. I., "Synthesis of Pentasil Zeolites from Sodium Silicate Solutions in the Presence of Quaternary Imidazole Compounds", *Zeolites*, 9, pp 458–467, 1989.

We claim:

1. A batch process for the production of ZSM-5 zeolites having a $SiO_2$ to $Al_2O_3$ of more than 10 comprising the steps of:
   (a) forming a reaction mixture comprising a silica source, an aluminum source, an inorganic base and templating agent and adjusting the pH to 10.7–11.7 with an acid;
   (b) heating the reaction mixture, while maintaining the pH at 10.7–11.7, whereby zeolite crystals are formed;
   (c) separating the crystallized zeolite from the reaction mixture leaving behind a residual mixture and calcinating the zeolite to decompose the organic component;
   (d) adding to the residual mixture templating agent at an amount so as to form a reaction mixture wherein the level of the templating agent is as in the reaction mixture of step (a); and (e) repeating steps (a)–(d), with the reaction mixture obtained in step (d) serving as the source for the templating agent of step (a) and every one or more cycles, when the salt concentration rises to a concentration which hinders further synthesis of the zeolites, treating the residual mixture of step (c) to remove salts therefrom.

2. A process according to claim 1, wherein the templating agent is selected from the group consisting of organic amines and organic alcohols.

3. A process according to claim 1, wherein the inorganic base is selected from the group consisting of NaOH and KOH.

4. A process according to claim 1, wherein the acid is selected from the group consisting of $H_2SO_4$, HBr and HCl.

5. A process according to claim 1, wherein the pH is adjusted to within the range of 11.0–11.3.

6. A process according to claim 1, wherein the reaction mixture in step (b) is heated to 100° C.–190° C.

7. A process according to claim 6, wherein the temperature is 170° C.–180° C.

8. A process according to claim 1, wherein the residual mixture of step (c) is treated to remove salts therefrom every two cycles.

9. A process according to any one of the preceding claims, wherein the salts produced from the reaction between the base and the acid are separated from the reaction mixture by a procedure selected from the group consisting of:
    (i) electrodialysis with a semi-permeable membrane;
    (ii) ion-exchanging;
    (iii) nanofiltration; and
    (iv) precipitation by lowering the temperature of the reaction mixture.

10. The process of claim 2, wherein said templating agent is tetrapropylammonium bromide or tetrabutylammonium bromide.

* * * * *